United States Patent [19]

Lauritzen et al.

[11] Patent Number: 4,796,912

[45] Date of Patent: Jan. 10, 1989

[54] ELONGATE GAS GENERATOR FOR INFLATING VEHICLE INFLATABLE RESTRAINT CUSHIONS

[75] Inventors: Donald R. Lauritzen, Hyrum; Gregory R. Goin, Smithfield, both of Utah

[73] Assignee: Morton Thiokol, Inc., Chicago, Ill.

[21] Appl. No.: 119,764

[22] Filed: Nov. 12, 1987

[51] Int. Cl.⁴ .............................................. B60R 21/26
[52] U.S. Cl. .................................... 280/736; 280/742; 102/530; 422/166
[58] Field of Search .................... 222/3; 280/741, 736, 280/734, 731, 728, 740, 737, 742; 102/530–531; 422/166, 305

[56] References Cited

U.S. PATENT DOCUMENTS

| | | | |
|---|---|---|---|
| 3,958,949 | 5/1976 | Plantif et al. | 102/531 X |
| 4,005,876 | 2/1977 | Jorgensen et al. | 280/741 |
| 4,203,787 | 5/1980 | Kirchoff et al. | 149/35 |
| 4,369,079 | 1/1983 | Shaw | 149/2 |
| 4,380,346 | 4/1983 | Davis et al. | 280/736 |
| 4,530,516 | 7/1985 | Adams et al. | 280/741 |

FOREIGN PATENT DOCUMENTS 2330194 12/1974 Fed. Rep. of Germany ...... 280/740

*Primary Examiner*—Joseph J. Rolla
*Assistant Examiner*—Nils E. Pedersen
*Attorney, Agent, or Firm*—James C. Simmons; Gerald K. White

[57] ABSTRACT

A gas generator which has a high volume combustion chamber for increased gas production and which is sized small enough to be confined within a vehicle steering wheel circumference with a minimum impact on the aesthetics of the steering wheel and general interior of the vehicle is used for inflating a vehicle inflatable restraint cushion in the event of an accident. The inflater is generally cylindrical in shape and includes a centrally disposed combustion chamber flanked by a pair of diffuser chambers.

20 Claims, 1 Drawing Sheet

ELONGATE GAS GENERATOR FOR INFLATING VEHICLE INFLATABLE RESTRAINT CUSHIONS

The present invention relates to gas generators for inflating vehicle inflatable restraint cushions. More particularly, the present invention relates to elongated gas generators which may be mounted on a steering wheel for inflating vehicle inflatable restraint cushions for driver protection.

Driver side gas generators have tended to have generally a square or circular shape as viewed in a plane parallel to the steering wheel. Such a gas generator is shown, for example, in U.S. Pat. No. 4,530,516 to Adams et al, which patent is assigned to the assignee of the present invention. In such a gas generator, an igniter assembly is typically contained centrally thereof and is generally surrounded by a combustion chamber. Surrounding the combustion chamber is typically an assembly of gas deflecting and filtering members. Gas exit ports are contained along the perimeter of the gas generator and are spaced circumferentially thereabout to effect flow of gas into a gas bag after it is passed through the filtering assembly for expanding the gas bag so that it may protect a driver in the event of an accident.

Generally, cylindrical elongate gas generators have typically been proposed for protection of passengers in a vehicle. One such gas generator is shown in U.S. Pat. No. 4,005,876 to Jorgensen et al, which patent is assigned to the assignee of the present invention. In this type of gas generator, an igniter means typically extends over the length of the gas generator and is centrally located therein. The igniter is typically surrounded by a combustion chamber which is in turn generally surrounded by filtering screens. The cylindrical housing is perforated to effect routing of the gases to a gas bag.

Since the radius of the combustion chamber of each of these inflaters or gas generators is substantially less than the corresponding housing radius, it is difficult to size either of the gas generators and their corresponding combustion chambers so as to on the one hand fit suitably within the steering wheel area and on the other hand provide sufficient combustion chamber volume for the intended use.

It is an object of the present invention to provide a small envelope gas generator which is suitable for installation on the steering wheel of a vehicle and has a large combustion chamber volume to insure adequate inflation of a gas bag.

It is another object of the present invention to provide such a gas generator which is sized so that it does not appreciably interfere with the aesthetics of the steering wheel and the general interior of the vehicle.

It is a further object of the present invention to provide such a gas generator which may be manufactured from a small number of parts and thus lend itself to high production fabrication methods.

It is a still further object of the present invention to provide such a gas generator wherein the combustion chamber lends itself to easy sealing methods and allows for small envelope leak testing.

It is a further object of the present invention to provide such a gas generator wherein the igniter boss construction allows room for adaption of various different initiators.

It is still another object of the present invention to provide such a gas generator which has a large pressure safety factor but without a weight penalty.

It is still another object of the present invention to provide such a gas generator wherein port tailoring of different generant loads and combustion chamber pressures may be provided.

It is a still further object of the present invention to provide reduced diffuser pressures and softer gas flow in such a gas generator.

It is yet another object of the present invention to provide improved filtering of the generated gas in such a gas generator.

It is another object of the present invention to provide for retention of a solid block of particulate matter within such a gas generator and away from the filtering screen so that even cleaner gas may be provided to the gas bag.

It is a still further object of the present invention to provide such a gas generator which is rugged, reliable, inexpensive, and provides a high volume of clean gas to a gas bag.

The above and other objects, features, and advantages of this invention will be apparent in the following detailed description of the preferred embodiments thereof which is to be read in connection with the accompanying drawings.

IN THE DRAWINGS

DETAILED DESCRIPTION OF THE PREFERRED EMBODIMENTS

Figure 1:
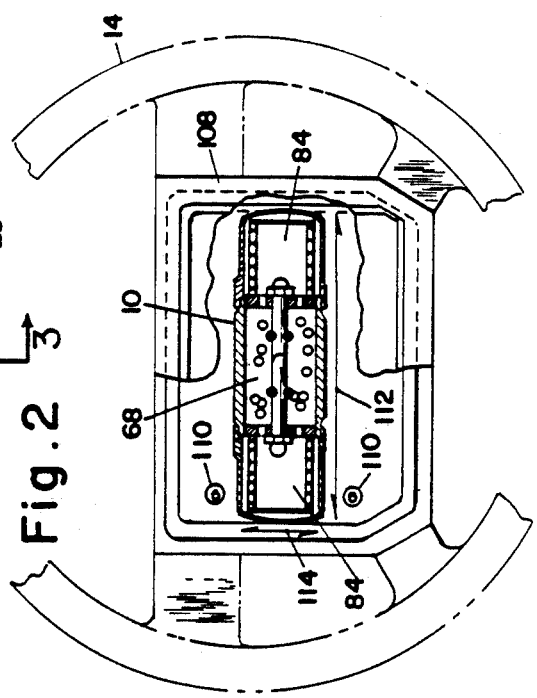
FIG. 1 is a schematic view of a gas generator embodying the present invention and mounted to a steering wheel.

Referring to the drawings, there is shown generally at 10 a gas generator for inflating a vehicle inflatable restraint cushion, i.e., a gas bag. The gas generator or inflater 10 is illustrated in FIG. 1 as mounted on steering wheel 14, and, as shown, the length of the inflater 10 is such that it may suitably be contained within the perimeter of the steering wheel 14.

Figure 3:
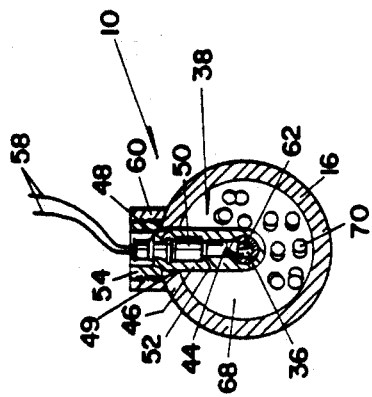
FIG. 3 is a sectional view of the gas generator of FIG. 2 taken along the lines 3—3 thereof.
Figure 2:
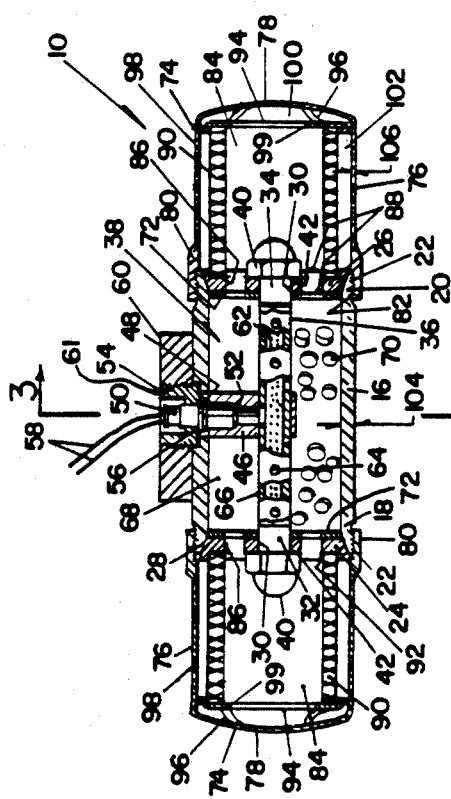
FIG. 2 is an elongate sectional view of the gas generator of FIG. 1.

At 16 is shown a tubular member which includes a pair of end portions 18 and 20 which have male threads, illustrated at 22, thereon. As shown in FIG. 2, the plate members 24 and 26 are inserted into the end portions 18 and 20 respectively which are flared outwardly to receive the similarly flared plate members and to suitably locate them, and they are suitably attached such as by pressing onto annular locking grooves or by screw threads and sealed by seal compound 28. A hole 30 is centrally located in each of the plate members 24 and 26 for receiving respective threaded end portions 32 and 34 of a cylindrical member 36 of an igniter assembly 38. Nuts 40 are screwed onto the threaded end portions 32 and 34 to retain the igniter assembly 38 in position, and a suitable elastomeric o-ring 42 is provided between each end portion 32 and 34 and the respective plate member 24 and 26 to seal the igniter installation. An aperture 44 is provided in the cylindrical member wall 36 intermediate the end portions 32 and 34. A tubular member 46 is welded or otherwise suitably sealingly attached to the cylindrical member 6 at aperature 44 or alternately the tubular member 46 and cylindrical member 36 may be forged to provide a T-joint for flow communication between the cylindrical member 36 and tubular member 46. The other end of tubular member 46 extends through an aperture 48 in the wall of the tubular member 16 and is suitably sealingly attached thereto such as by a gasket 49. A mounting plate 60 is suitably attached to tubular member 16 such as by welding or may be formed integrally with tubular member 6 to provide means for attachment of the inflater 10 to the steering wheel 14. The mounting plate 60 includes an aperture 61 which aligns and communicates with tubular member 46. A suitable initiator or squib 50 is inserted in the aperture 61 and into the tubular member 46 and rests on a shoulder 52 therein. The squib 50 is sealingly retained therein by means of a retainer member 54, which is threadedly received in the mounting plate aperture 61, and a suitable seal 56. Electrical lead wires 58 connect to the squib 50 to transmit thereto an electrical signal from a crash sensor (not shown) to fire the squib 50 in the event of an automobile accident.

The cylindrical member 36 contains a pyrotechnic material illustrated at 62 which may be any of a variety of compositions meeting the requirements for rapid ignition and non-toxicity, a typical material for this use being a granular mixture of by weight 25 percent boron and 75 percent potassium nitrate. The cylindrical member 36, which is closed at both ends by cap nuts 40, is perforated along its length by a plurality of perforations 64. A layer 66 of aluminum foil is caused to cover the perforations 64 to hermetically seal, prior to ignition, the igniter 36. The firing of the squib 50 causes ignition of the pyrotechnic material 62 which in turn releases hot gases through the perforations 64, bursting the aluminum foil 66, and into the combustion chamber, illustrated at 68, which is defined as the space (except for the igniter assembly 38) bounded by the tubular member 16 and plate members 24 and 26. Since the radius of the combustion chamber 68 is as a result substantially equal to the inner radius of the tubular member 16, the combustion chamber 68 is thereby provided with a volume to provide, in accordance with the present invention, a maximum amount of solid fuel gas generant composition, illustrated at 70, within the size limitations of the inflater 10. The combustion chamber 68 has a tubular construction to provide a large pressure safety factor without a weight penalty. The aluminum foil 66, in addition to providing an hermetic seal, is also provided to insure that the high temperature gases produced by the pyrotechnic material 62, upon firing of the squib 50, have sufficient pressure to permeate the gas generant composition pellets 70 thoroughly for efficient and sustained ignition before they are released by rupture of the foil 66. The combustion chamber 68 contains a styrofoam cushion 72 along each of its sides to protect the pellets 70 against breakage. The gas generant pellets 70 may be any one of a number of compositions meeting the requirements of burning rate, non-toxicity, and flame temperature. Examples of compositions that may be used are described in U.S. Pat. Nos. 4,203,787 to Kirchoff et al and 4,369,079 to Shaw, which are hereby incorporated herein by reference. Although a generant load for such compositions in conventional inflaters is typically about 100 grams, it is considered desirable to provide a greater load, such as 120 grams, to insure sufficient gas production or to allow the use of a different composition which may not otherwise produce sufficient gas. In order to achieve such an increased load in accordance with the present invention, the combustion chamber 68 is preferably sized to have a volume equal to at least 7.0 cubic inches.

A cap-like member 74, which includes a cylindrical portion 76 and a portion 78 closing one end thereof and which at the other end thereof has a threaded portion 80 including female threads 82, is threadedly engaged to each end portion 18 and 20 respectively of the tubular member 16 to form a diffuser chamber 84 bounded by the respective cap-like member 74 and the respective plate member 24 and 26. Thus, diffuser chambers 84 are provided on each side of the combustion chamber 68. In order to facilitate assembly and provide a tamper resistant assembly in accordance with an alternative embodiment of this invention, the diffuser chambers 84 may be attached to the tubular member 16 by means of a straight thread push-on joint. Since the structures of the diffuser chambers 84 are alike and perform the same functions, only the diffuser chamber 84 associated with the plate member 26 will be described hereinafter, it being understood that the description thereof will apply equally to the structure and function of the diffuser chamber 84 associated with the plate member 24.

The plate member 26 has a plurality of apertures 86 therein to provide a flow path for generated gases from the combustion chamber 68 to the diffuser chamber 84. Similarly, plate member 24 has a plurality of apertures 86 therein. In order to hermetically seal the combustion chamber 68, a suitable foil such as a heat seal aluminum foil 88 is applied to one or both but preferably both sides of each of the plate members 24 and 26. The plate members 24 and 26 provide area for port tailoring of different generant loads and combustion chamber pressures.

A generally cylindrical filter pack 90 composed of screen and/or other suitable filter materials for cooling the generated gases and removing particulate therefrom is disposed in the diffuser chamber 84 generally concentrically with the cylindrical portion 76 and extends generally over the length thereof. The filter pack 90 is held at one end in a notch 92 in the plate member 26 and at the other end by a screen retainer member 94 which is held in position by spring 96. The notch 92 in which an end of the filter pack 90 is seated is located radially outwardly of all of the apertures 86 in the plate member 26. The retainer 94 closes the space between the other end of the filter pack 90 and the diffuser wall 76, and the filter pack extends over generally the length of the diffuser chamber 84 so that generated gas and particulate matter therein is prevented from getting between the filter pack 90 and the diffuser wall 76 except by flow through the filter pack 90.

Apertures 98 are provided in the cylindrical portion 76 to provide flow passages for filtered generated gas from the diffuser chamber 84 into a suitable gas bag (not shown) for inflating the gas bag for protection of a vehicle occupant in case of an accident. The quantity and size of these apertures 98 as well as other apertures 64 and 86 may be determined applying principles commonly known to those of ordinary skill in the art to which this invention pertains.

In order to reduce the amount of filtering required of the filter pack 90 as well as to reduce the chances of clogging thereof so as to achieve finer filtering of the gases by the filter pack 90 for cleaner gas flow to the gas bag (not shown) in accordance with a preferred embodiment of the present invention, the retainer 94 has a central opening 99 therein and is spaced from the end wall 78 to define a space or trap, illustrated at 100, therebetween whereby a cooling surface is provided on the end wall 78 and a solid block of particulate matter or other heavy residue may be accordingly formed and trapped in the space 100.

If the filter pack 90 were positioned adjacent to the apertures 98, there would be a tendency for the gas to flow through the filter pack 90 only in portions thereof which are in line with the apertures 98, and the remaining portions of the filter pack may not as a result be adequately utilized for filtering. In order to provide a more efficient use of the filter pack 90 wherein there is a uniform flow of gas therethrough over the entire length and circumference thereof in accordance with a preferred embodiment of the present invention, the filter pack 90 is disposed in the diffuser chamber 84 so that it is spaced from the diffuser wall 76 so as to provide a plenum chamber 102 between the filter pack 90 and the diffuser wall 76. In order to prevent entry of particulate matter to the plenum chamber 102 from around either end of the filter pack 90, the notch 92 is located radially outwardly of all of the apertures 86 as previously stated and the retainer 94 is provided.

Although the combustion and diffuser chamber walls 16 and 74 respectively may be composed of any suitable material which may withstand the pressures encountered therein, they are preferably composed of aluminum which provides minimum weight to the inflater 10. The sizes discussed hereinafter are based on the use of aluminum. The combustion chamber wall thickness, illustrated at 104, which may typically be 0.10 inch, must be adequate to withstand the high combustion chamber pressures. However, the diffuser chambers 84 are not required to withstand such high pressures. In order to provide a lighter and less expensive inflater in accordance with a preferred embodiment of the present invention, the walls 76 and 78 of the diffuser chambers 84 have a thickness, illustrated at 106, which is less than the thickness 104 of the combustion chamber wall. Furthermore, the diffuser chambers 84 provide an increased area for diffuser apertures 98 so as to maintain lower diffuser pressures and softer gas flow, and the thickness of the walls 76 and 78 may correspondingly be even further reduced. For example, the thickness 106 may be 0.022 inch (less than one-fourth of the combustion chamber wall thickness 104) to adequately withstand the pressures encountered within the diffuser chamber 84. With lower diffusion pressures as well as the larger screen packs 90 which may be provided in the increased volume diffuser chambers 84, finer filtering may also be effected to provide cleaner gas flow to the gas bag.

Referring to FIG. 11, the inflater mounting plate 60 is fixedly attached to a reaction plate 108 to which is also attached the gas bag (not shown). The reaction plate 108 is in turn fixedly secured to the hub of steering wheel 14 by means of suitable fastening means such as screws illustrated at 110.

A circular gas generator such as shown in the aforesaid patent to Adams et al may typically have a combustion chamber volume of typically about 5 cubic inches which may contain about 85 grams of solid fuel pellets. In accordance with the present invention, the inflater 10 is provided with a length illustrated at 112 of preferably less than about 8 inches and a diameter illustrated at 114 of preferably less than about 2 inches, and the combustion chamber may be sized, in accordance with principles commonly known to those having ordinary skill in the art to which this invention pertains, to have a volume of at least about 7 cubic inches adequate to contain about 120 grams of solid fuel pellets 70 so as to provide higher performance with the same type of fuel or equal performance with a less efficient fuel.

Thus, there is provided in accordance with the present invention an inflater which may be sized to provide a maximum combustion chamber volume while being confined within the perimeter of an automobile steering wheel and having a minimum effect on the aesthetics of the steering wheel and the general interior of the vehicle. Such an inflater 10 may even be placed on the steering wheel hub of even subcompact automobiles.

The combustion chamber 68, which contains the environmentally sensitive components, lends itself to easy sealing methods since the only openings therefrom are in the plates 24 and 26 which are easily accessible by removal of the cap members 74. The combustion chamber 68, with the members 74 removable therefrom, thus also allows for small envelope leak testing. The construction of the inflater from a small number of parts permits the use of high production fabrication methods.

The igniter boss construction allows for adaption of a variety of different initiators which may be required by different vehicle manufacturers.

Functioning of the inflater 10 begins with an electrical signal from a crash sensor (not shown) through wires 58 to the squib 50. The squib 50 fires into the igniter granules 62 which burn with the development of hot gases under pressure that burst through the aluminum foil 66 and flow through perforations 64 and into the combustion chamber 68. The hot igniter gases ignite the gas generant pellets 70 which release inflation gases. These inflation gases burst through the aluminum foil 88 and flow through plate apertures 86 into the diffuser chambers 84. Some particulate matter is removed from the inflation gases in traps 100. With some of the particulate matter removed, the resulting cleaner inflation gases pass through filter packs 90, which serve to cool and remove additional particulate matter from them, and into plenum chambers 102. The inflation gases then exit the inflater through diffuser chamber apertures 98 and into the gas bag (not shown) of a vehicle restraint system.

It is to be understood that the invention is by no means limited to the specific embodiments which have been illustrated and described herein, and that various modifications thereof may indeed be made which come within the scope of the present invention as defined by the appended claims.

We claim:

1. A gas generator for inflating a vehicle inflatable restraint cushion comprises a tubular member having a pair of end portions, a pair of plate members one of which is attached to one of said end portions of said tubular member and the other of which is attached to the other of said end portions to define a combustion chamber therewithin, a solid fuel gas generant composition contained within the combustion chamber, ignition means for igniting said solid fuel gas generant composition, a plurality of aperture means in each said plate member for effecting exit of generated gases from the combustion chamber, a pair of chamber means one of which is attached to one of said pair of tubular member end portions and the other of which is attached to the other of said pair of tubular member end portions for receiving and filtering the generated gases, and means for routing the generated gases from said pair of chamber means to an inflatable restraint cushion.

2. A gas generator as claimed in claim 1 further comprises a filter means in at least one of said chamber means and a particulate trap means in said at least one chamber means for removing particulate matter from the generated gas as it is cooled and for retaining the particulate matter to prevent its entry into said filter means.

3. A gas generator as claimed in claim 1 further comprises an hermetic seal means for the combustion chamber.

4. A gas generator as claimed in claim 3 wherein said hermetic seal means includes at least one rupturable foil member disposed to sealingly cover said plurality of aperture means in at least one of said plate members.

5. A gas generator as claimed in claim 1 wherein at least one of said chamber means includes a wall the thickness of which is less than the thickness of said tubular member.

6. A gas generator as claimed in claim 1 further comprises means for attaching the gas generator to the steering wheel of a vehicle.

7. A gas generator as claimed in claim 6 wherein the combustion chamber has a volume for containing solid fuel gas generant composition which is equal to at least about 7 cubic inches.

8. A gas generator as claimed in claim 7 wherein the gas generator has a length which is less than about 8 inches and a diameter which is less than about 2 inches.

9. A gas generator as claimed in claim 1 wherein at least one of said chamber means includes a tubular wall which is screwed onto said respective end portion of said tubular member.

10. A gas generator as claimed in claim 1 further comprises a filter means which is disposed in at least one of said chamber means and which extends generally over the length of said at least one chamber means, said filter means engages said respective plate member at one end, and the gas generator further comprises a retainer means which engages the other end of said filter means for retaining said filter means in position.

11. A gas generator as claimed in claim 10 wherein said filter means is generally cylindrical and is spaced from said tubular wall to define a plenum chamber between said filter means and said tubular wall, and the gas generator further comprises means for preventing entry of particulate matter to the plenum chamber from around either end of said filter means.

12. A gas generator as claimed in claim 1 wherein at least one of said chamber means includes a wall the thickness of which is less than about one-fourth of the thickness of said tubular member.

13. A gas generator for inflating a vehicle inflatable restraint cushion comprises a tubular member having a pair of end portions, a pair of plate members one of which is attached to one of said end portions of said tubular member and the other of which is attached to the other of said end portions to define a combustion chamber therewithin, a solid fuel gas generant composition contained within the combustion chamber, ignition means for igniting said solid fuel gas generant composition, a plurality of aperture means in each said plate member for effecting exit of generated gases from the combustion chamber, a pair of chamber means one of which is attached to one of said pair of tubular member end portions and the other of which is attached to the other of said pair of tubular member end portions for receiving and filtering the generated gases, and means for routing the generated gases from said pair of chamber means to an inflatable restraint cushion, said ignition means includes an igniter which is disposed centrally of the combustion chamber and which extends between and is fixedly attached to said plate members.

14. A gas generator for inflating a vehicle inflatable restraint cushion comprises a tubular member having a pair of end portions, a pair of plate members one of which is attached to one of said end portions of said tubular member and the other of which is attached to the other of said end portions to define a combustion chamber therewithin, a solid fuel gas generant composition contained within the combustion chamber, ignition means for igniting said solid fuel gas generant composition, a plurality of aperture means in each said plate member for effecting exit of generated gases from the combustion chamber, a pair of chamber means one of which is attached to one of said pair of tubular member end portions and the other of which is attached to the other of said pair of tubular member end portions for receiving and filtering the generated gases, and means for routing the generated gases from said pair of chamber means to an inflatable restraint cushion, at least one of said chamber means includes a tubular wall, said routing means includes a plurality of aperture means in said tubular wall, the gas generator further comprises a generally cylindrical filter means which is disposed in and extends generally over the length of said at least one chamber means and which is spaced from said tubular wall to define a plenum chamber between said filter means and said tubular wall, and means for preventing entry of particulate matter to the plenum chamber from around either end of said filter means.

15. A gas generator as claimed in claim 14 wherein at least one of said chamber means includes a wall the thickness of which is less than the thickness of said tubular member.

16. A gas generator as claimed in claim 14 further comprises particulate trap means in said at least one chamber means for removing particulate matter from the generated gas as it is cooled and for retaining the particulate matter to prevent its entry into said filter means.

17. A gas generator as claimed in claim 16 further comprises an hermetic seal means for the combustion chamber.

18. A gas generator as claimed in claim 17 wherein at least one of said chamber means includes a wall the thickness of which is less than the thickness of said tubular member.

19. A gas generator as claimed in claim 18 wherein said ignition means includes an igniter which is disposed centrally of the combustion chamber and which extends between and is fixedly attached to said plate members.

20. A gas generator as claimed in claim 19 further comprises means for attaching the gas generator to the steering wheel of a vehicle.

* * * * *